US 10,105,840 B2

(12) United States Patent
Inaba

(10) Patent No.: US 10,105,840 B2
(45) Date of Patent: Oct. 23, 2018

(54) ROBOT SYSTEM INCLUDING PLURALITY OF CONTROLLERS CONNECTED VIA NETWORK

(71) Applicant: FANUC CORPORATION, Yamanashi (JP)

(72) Inventor: Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 157 days.

(21) Appl. No.: 15/290,286

(22) Filed: Oct. 11, 2016

(65) Prior Publication Data

US 2017/0113343 A1 Apr. 27, 2017

(30) Foreign Application Priority Data

Oct. 21, 2015 (JP) .................. 2015-207065

(51) Int. Cl.
*B25J 9/00* (2006.01)
*B25J 13/06* (2006.01)
*B25J 9/16* (2006.01)

(52) U.S. Cl.
CPC ............. *B25J 9/0084* (2013.01); *B25J 9/161* (2013.01); *B25J 9/163* (2013.01); *B25J 9/1674* (2013.01); *B25J 13/06* (2013.01)

(58) Field of Classification Search
CPC ........ B25J 9/0084; B25J 13/06; B25J 9/1674; B25J 9/161; B25J 9/163
USPC ................................................ 700/245, 248
See application file for complete search history.

(56) References Cited

U.S. PATENT DOCUMENTS

| 7,577,497 | B2* | 8/2009 | Johannessen | B25J 9/1674 |
| | | | | 318/568.11 |
| 8,108,092 | B2* | 1/2012 | Phillips | G05D 1/0033 |
| | | | | 700/245 |
| 2002/0045970 | A1* | 4/2002 | Krause | B25J 9/1656 |
| | | | | 700/264 |
| 2003/0220715 | A1 | 11/2003 | Kneifel, II et al. | |
| 2004/0260426 | A1* | 12/2004 | Johannessen | B25J 9/1674 |
| | | | | 700/245 |
| 2004/0260563 | A1* | 12/2004 | Hashimoto | B25J 9/1602 |
| | | | | 704/275 |
| 2006/0047365 | A1* | 3/2006 | Ghodoussi | G06F 19/3418 |
| | | | | 700/251 |

(Continued)

FOREIGN PATENT DOCUMENTS

| CN | 1899774 A | 1/2007 |
| CN | 101092035 A | 12/2007 |

(Continued)

*Primary Examiner* — Jaime Figueroa
(74) *Attorney, Agent, or Firm* — Hauptman Ham, LLP

(57) ABSTRACT

A robot system enabling a single teaching console to be used to easily teach a plurality of robots. The robot system includes a plurality of robot controllers connected through a network and a single teaching console. The teaching console is configured to be able to selectively communicate with any one of the robot controllers. The robot controller is configured so as to send a connect request to the teaching console when it is judged that the state of the robot has been switched to the teaching phase or maintenance phase. The teaching console is configured to respond to a connect request from the robot controller and switch destinations to enable communication with the robot controller.

3 Claims, 3 Drawing Sheets

(56) References Cited

U.S. PATENT DOCUMENTS

| | | | |
|---|---|---|---|
| 2006/0095158 A1* | 5/2006 | Lee | H04M 1/72533 700/245 |
| 2007/0093939 A1* | 4/2007 | Kobayashi | B25J 9/16 700/245 |
| 2009/0164039 A1* | 6/2009 | Jung | G05B 19/0426 700/117 |
| 2009/0299524 A1* | 12/2009 | Evans | B25J 9/1656 700/248 |
| 2010/0036526 A1* | 2/2010 | Eriksson | B25J 9/161 700/250 |
| 2010/0106299 A1 | 4/2010 | Nagata | |
| 2010/0211220 A1* | 8/2010 | Nishi | G05B 19/41825 700/248 |
| 2010/0305758 A1* | 12/2010 | Nishi | B23Q 17/00 700/264 |
| 2013/0158708 A1* | 6/2013 | Emmertz | G05B 19/0426 700/248 |
| 2015/0239120 A1* | 8/2015 | Yamamoto | B25J 9/1602 700/247 |
| 2015/0352724 A1* | 12/2015 | Nobuhara | B25J 13/006 700/249 |

FOREIGN PATENT DOCUMENTS

| | | |
|---|---|---|
| CN | 101092035 B | 1/2012 |
| CN | 103909516 A | 7/2014 |
| CN | 104772754 A | 7/2015 |
| CN | 104858872 A | 8/2015 |
| JP | 2001-100805 A | 4/2001 |
| JP | 2005-131747 A | 5/2005 |
| JP | 2006-246438 A | 9/2006 |
| JP | 2007-141205 A | 6/2007 |
| JP | 2008-197856 A | 8/2008 |
| JP | 2011-67892 A | 4/2011 |
| JP | 2012-157958 A | 8/2012 |
| JP | 2012-171029 A | 9/2012 |
| JP | 2014-104561 A | 6/2014 |
| JP | 2015-44280 A | 3/2015 |
| JP | 2015-157325 A | 9/2015 |
| WO | 2006096695 A2 | 9/2006 |
| WO | 2006/137239 A1 | 12/2006 |
| WO | 2009/097895 A1 | 8/2009 |

* cited by examiner

ROBOT SYSTEM INCLUDING PLURALITY OF CONTROLLERS CONNECTED VIA NETWORK

RELATED APPLICATIONS

The present application claims priority to Japanese Patent Application Number 2015-207065, filed Oct. 21, 2015, the disclosure of which is hereby incorporated by reference herein in its entirety.

BACKGROUND OF THE INVENTION

1. Field of the Invention

The present invention relates to a robot system including a plurality of controllers connected through a network.

2. Description of the Related Art

In a conventional robot system including a plurality of robot controllers, one teaching console is used for each of the different robot controllers. For this reason, when a single operator teaches a plurality of robots, he has to switch teaching consoles operated on corresponding to the robots taught. The work efficiency is therefore low. Further, despite the fact that a single operator can only operate a single teaching console at one time, the same number of teaching consoles as the number of robots is necessary. This can become a factor increasing costs.

International Patent Publication No. WO2006/096695A discloses a robot system in which a single teaching device can be selectively connected to one or more robot controllers through a network. However, according to this related art, the operator has to select the robot controller to teach, log in, then teach it, so the work efficiency is low.

SUMMARY OF INVENTION

Therefore, a robot system enabling a single teaching console to be used to easily teach a plurality of robots has been sought.

According to the present invention, there is provided a robot system including at least two robot controllers respectively controlling at least two robots, a network connecting the at least two robot controllers together, a teaching console able to be connected to the network and configured so as to teach operations of the at least two robots, and a communicating part selectively determining a destination of communication of the network so that communication is possible between any robot controller selected from the at least two robot controllers and the teaching console, in which robot system, each of the at least two robot controllers includes a phase judging part automatically judging if the corresponding robot is in an automatic operating phase where it is automatically operated or in a teaching phase where it is taught by the teaching console or in a maintenance phase where a maintenance process is performed and a notifying part notifying the teaching console of a connect request when it is judged by the phase judging part that the state of the corresponding robot has been switched to the teaching phase or the maintenance phase, and the communicating part is configured to respond to the connect request and switch the destination of communication so that the robot controller emitting the connect request and the teaching console can communicate with each other.

In a preferred embodiment, the robot system further comprises switching devices respectively set at or connected to the at least two robot controllers and switching between an automatic operating mode for making a corresponding robot automatically operate and a teaching mode for using the teaching console to teach a corresponding robot, and each phase judging part is configured so as to judge that the robot is in the teaching phase when the teaching mode is selected.

In a preferred embodiment, each of the at least two robot controllers further comprises a display part displaying a content of an abnormality at the teaching console when an abnormality occurs at the robot controller or the corresponding robot, and each phase judging part is configured to judge that a robot at which an abnormality has occurred or a robot controlled by a robot controller at which an abnormality has occurred is in a maintenance phase.

In a preferred embodiment, each of the at least two robot controllers further comprises a connection judging part judging if the network is connected to, and each phase judging part is configured to judge that the robot corresponding to the robot controller is in a maintenance phase when the robot controller is switched from a non-connected state to a connected state with respect to the network.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Figure 1:
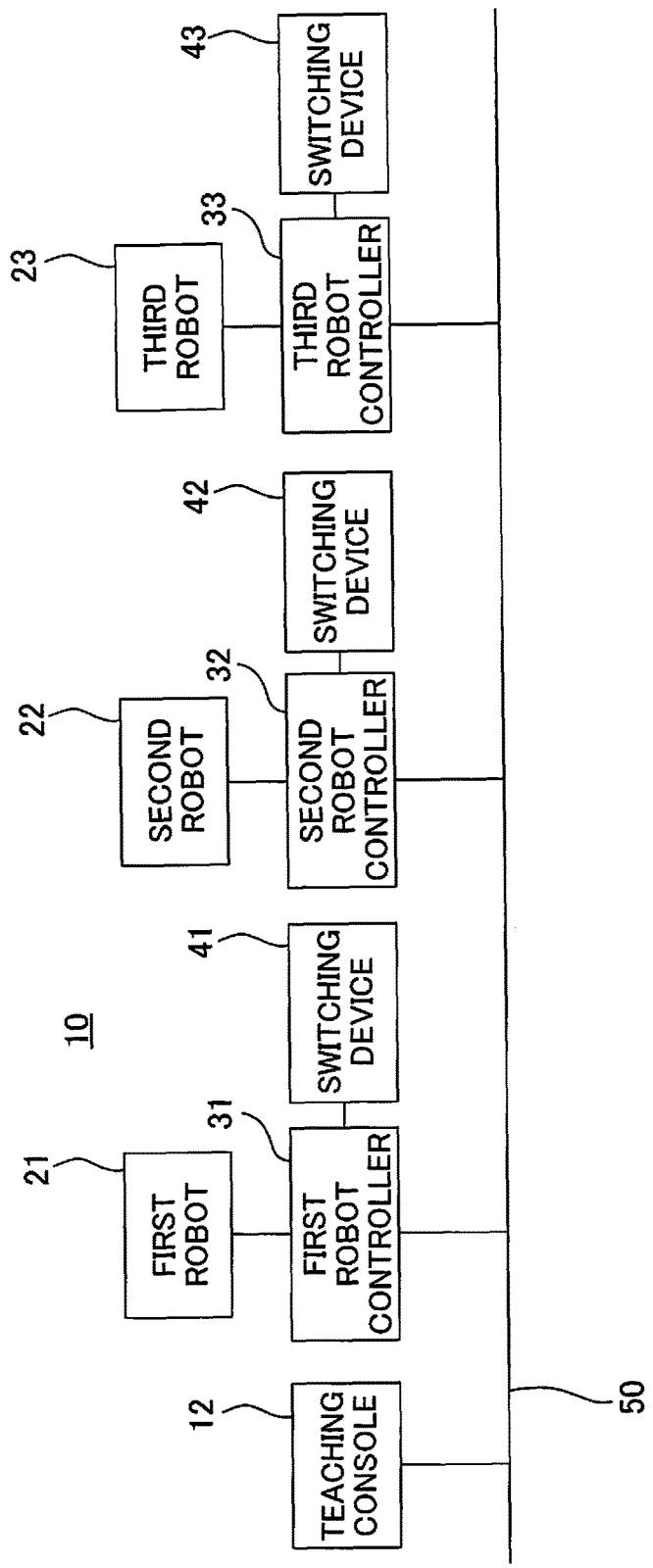
FIG. 1 is a view showing the configuration of a robot system according to one embodiment.

Below, referring to the attached drawings, embodiments of the present invention will be explained. FIG. 1 shows an example of the configuration of a robot system according to one embodiment. The robot system 10 includes a first robot 21, second robot 22, third robot 23, first robot controller 31 controlling the first robot 21, second robot controller 32 controlling the second robot 22, third robot controller 33 controlling the third robot 23, and teaching console 12.

The first robot 21, second robot 22, and third robot 23 are robots having known configurations. They may be the same types of robots or may be different types of robots.

The robot controllers 31, 32, and 33 have switching devices 41, 42, and 43, respectively, provided at or connected to them. The switching devices 41, 42, and 43 are used for switching the operating modes of the corresponding robots 21, 22, and 23, respectively. Specifically, the robots 21, 22, and 23 are configured so as to be alternately switched between an automatic operating mode and a teaching mode by the respective switching devices 41, 42, and 43.

The switching devices 41, 42, and 43, for example, have the form of switches which are manually operated by the operator. When the automatic operating mode is selected, the robots 21, 22, and 23 are automatically operated in accordance with a predetermined control program. When the teaching mode is selected, the robots 21, 22, and 23 operate in accordance with commands of the teaching console 12.

The robot controllers 31, 32, and 33 are digital computers including known component elements, for example, CPUs, memories, and interfaces.

The CPUs perform the processing necessary for controlling the corresponding robots 21, 22, and 23. The memories include ROMs, volatile memories, and nonvolatile memories. The ROMs store basic programs for controlling the overall operations of the robot controllers 31, 32, and 33. The nonvolatile memories store control programs for controlling the robots 21, 22, and 23 and various parameters and other settings. The volatile memories are used for temporarily storing the results of processing of the CPUs, various input information, etc.

The interfaces are used for connecting the robot controllers 31, 32, and 33 and external devices. For example, the robot controllers 31, 32, and 33 receive signals corresponding to the switching operations of the switching devices 41, 42, and 43 through the interfaces.

As shown in FIG. 1, the robot controllers 31, 32, and 33 are connected to each other through the network 50. The network 50 is, for example, an Ethernet® or wireless LAN or other known network.

The teaching console 12 can connect to the network 50 and is configured to be connected to the robot controllers 31, 32, and 33 through the network 50. The teaching console 12 can communicate with a single robot controller selected from the robot controllers 31, 32, and 33, for example, the first robot controller 31. In this case, the operator can teach the robot 21 controlled by the destination robot controller 31.

That is, when the teaching console 12 is in a state able to communicate with one robot controller, for example, the first robot controller 31, the teaching console 12 cuts communication with the other robot controllers 32 and 33. The switching of the robot controller of the destination of the teaching console 12 will be explained later in detail.

In the present embodiment, the robot controllers 31, 32, and 33 are configured to automatically judge the operating states (phases) of the corresponding robots 21, 22, and 23. The operating states of the robots 21, 22, and 23 are divided into the automatic operating phase, teaching phase, and maintenance phase.

The automatic operating phase means the state where the robots 21, 22, and 23 are automatically operated in accordance with a predetermined control program. The teaching phase means the state where the robots 21, 22, and 23 are taught by the operator through the teaching console 12. The maintenance phase means the state where the maintenance process of the robots 21, 22, and 23, for example, work for confirming the states of the robots 21, 22, and 23 or work for restoration from an alarm stop is being performed.

Figure 2:
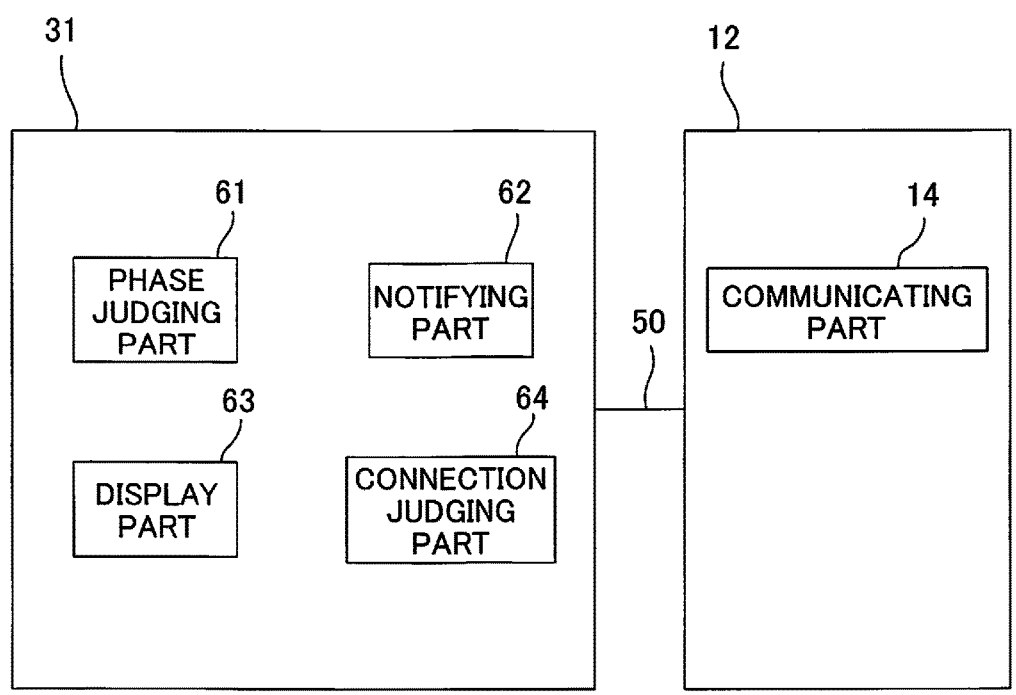
FIG. 2 is a functional block diagram of a robot system.

FIG. 2 is a functional block diagram of the robot system 10. In FIG. 2, for simplification, only the first robot controller 31 is shown. However, the explanation for the first robot controller 31 similarly applies to the second robot controller 32 and third robot controller 33 as well. Below, for convenience, the first robot controller 31 will sometimes simply be referred to as the "robot controller 31". Similarly, the first robot 21 will sometimes simply be referred to as the "robot 21".

As shown in FIG. 2, the robot controller 31 includes a phase judging part 61, notifying part 62, display part 63, and connection judging part 64. Further, the teaching console 12 is provided with a communicating part 14.

The phase judging part 61 automatically judges if the robot 21 controlled by the robot controller 31 is in the automatic operating phase, is in the teaching phase taught by the teaching console 12, or is in the maintenance phase where the maintenance process is performed.

In one embodiment, the phase judging part 61 may be configured to judge that the robot 21 is in the teaching phase when the operator selects the teaching mode by the switching device 41.

In another embodiment, the phase judging part 61 may be configured to judge that the robot 21 is in the maintenance phase when an abnormality occurs in the robot 21 or robot controller 31.

In still another embodiment, the phase judging part 61 is configured to judge that the robot 21 is in the maintenance phase when the robot controller 31 is switched from a non-connected state to a connected state with respect to the network 50.

The notifying part 62 sends a connect request to the teaching console 12 when the phase judging part 61 judges that the state of the robot controlled by the robot controller 31 is switched to the teaching phase or maintenance phase.

The display part 63 displays the content of an abnormality at the teaching console 12 when an abnormality occurs at the robot 21 or robot controller 31.

The connection judging part 64 judges if the robot controller 31 is connected to the network. The connection judging part 64 is configured to emit a signal when the robot controller 31 is changed from the non-connected state to the connected state. The phase judging part 61 responds to the signal from the connection judging part 64 and judges that the robot 21 is in the maintenance phase.

The communicating part 14 selectively determines the destination of communication of the network 50 so as to enable any robot controller selected from among the first robot controller 31, second robot controller 32, and third robot controller 33 (for example, the first robot controller 31) and the teaching console 12 to communicate with each other. In the present embodiment, the communicating part 14 responds to a connect request from the robot controller 31, 32, or 33 and determines the destination of communication of the teaching console 12.

Figure 3:
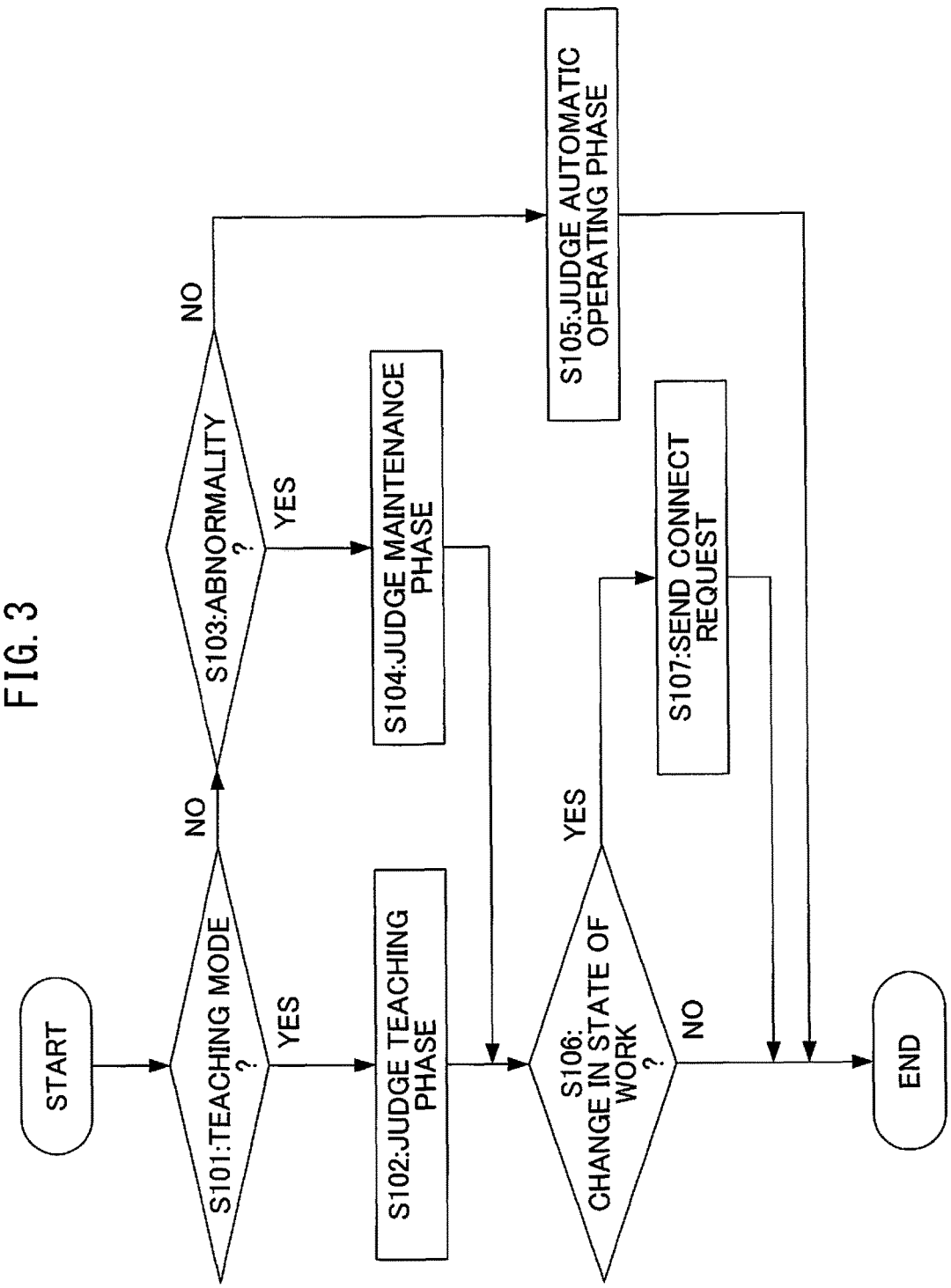
FIG. 3 is a flow chart showing processing performed by the robot system according to one embodiment.

Referring to FIG. 3, the processing performed at the robot system 10 according to one embodiment will be explained.

At step S101, it is judged if the teaching mode has been selected at the switching device 41. When the teaching mode has been selected (case where result of judgment of step S101 is positive), the routine proceeds to step S102 where the phase judging part 61 judges that the robot 21 is in the teaching phase.

When the result of judgment of step S101 is negative, the routine proceeds to step S103 where it is judged if an abnormality has occurred at the robot 21 or robot controller 31.

When an abnormality occurs (case where the result of judgment of step S103 is positive), the routine proceeds to step S104 where the phase judging part 61 judges that the robot controller 31 is in the maintenance phase.

When, at step S102 or step S104, it is judged that the robot controller 31 is in the teaching phase or maintenance phase, the routine proceeds to step S106 where it is judged if the operating state (phase) has changed. That is, at step S106, it is judged if the result of judgment of the phase has changed from the operating state (phase) judged immediately before.

When it is judged that the operating state has not changed (when the result of judgment at step S106 is negative, the processing is ended.

On the other hand, when the result of judgment at step S106 is affirmative, the routine proceeds to step S107 where the notifying part 62 sends a connect request to the teaching console 12.

Further, when the result of judgment at step S103 is negative, the routine proceeds to step S105 where the phase judging part 61 judges that the robot controller 31 is in the automatic operating phase. In the case of the automatic operating phase where the robot is automatically operated, teaching is not performed utilizing the teaching console 12, so the processing is ended.

The processing of steps S101 to S107 is repeated at a predetermined control period.

According to the present embodiment, a single teaching console 12 is used to teach a plurality of robots 21, 22, and 23, so the system cost can be slashed. Further, the teaching console 12 is automatically connected to the robot controller 31, 32, or 33 controlling the robot 21, 22, or 23 to be taught, so the work efficiency can be improved.

Further, according to the present embodiment, when an abnormality occurs at the robot 21, 22, or 23 or at the robot controller 31, 32, or 33, the robot controller 31, 32, or 33 sends a connect request to the teaching console 12. The operator can connect the teaching console 12 to the robot controller in which the abnormality occurs so as to check the content of the abnormality, so necessary action can be quickly taken.

Further, according to the present embodiment, when the robot controller 31, 32, or 33 is powered up and connected to the network 50, the robot controller 31, 32, or 33 sends a connect request to the teaching console 12. For example, if a power outage or other factor causes the supply of power to the robot controller 31, 32, or 33 to be cut, the network connection between the teaching console 12 and that robot controller 31, 32, or 33 is broken. After that, if the network connection is restored, a connect request is automatically sent from the robot controller 31, 32, or 33, so even if the operator does not perform a specific operation, the work performed using the teaching console 12 immediately before the power was cut can be quickly resumed.

Note that, the robot system 10 illustrated in FIG. 1 includes three robots and robot controllers, but in another embodiment, a set of two or a set of four or more robots and robot controllers may be used.

The robot system 10 illustrated in FIG. 1 has the teaching console 12 directly connected to the network 50, but in another embodiment, the teaching console 12 may be connected to one robot controller and indirectly connected to the network 50 through the robot controller.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the robot system according to the present invention, a single teaching console can be used to teach a plurality of robots, so the system cost can be slashed. Further, the teaching console is automatically connected to a robot controller being taught, so the work efficiency can be improved.

What is claimed is:

1. A robot system comprising:
at least two robot controllers respectively controlling at least two robots,
a network connecting the at least two robot controllers together,
a teaching console that is able to be connected to the network and configured to teach operations of the at least two robots, and
a communicating part selectively determining a destination of communication of the network so that communication is possible between any robot controller selected from the at least two robot controllers and the teaching console, in which robot system,
wherein each of the at least two robot controllers comprises
a phase judging part automatically judging on power-up if the corresponding robot is in an automatic operating phase where it is automatically operated or in a teaching phase where it is taught by the teaching console or in a maintenance phase where a maintenance process is performed,
a notifying part notifying the teaching console of a connect request when it is judged by the phase judging part that the state of the corresponding robot has been switched to the teaching phase or the maintenance phase, and
a connection judging part judging that a connection to the network has been established on power-up and notifying the phase judging part,
wherein the phase judging part judges that the robot corresponding to the robot controller is in a maintenance phase when the connection judging part notified that the connection to the network has been established on power-up, and
wherein the communicating part is configured to respond to the connect request, when a communication has been established with the robot controller that is not the robot controller that sent the connect request, cut the communication with the robot controller being connected, and switch the destination of communication so that the robot controller sending the connect request and the teaching console can communicate with each other.

2. The robot system according to claim 1, wherein
the robot system further comprises switching devices respectively set at or connected to the at least two robot controllers and switching between an automatic operating mode for making a corresponding robot automatically operate and a teaching mode for using the teaching console to teach a corresponding robot, and
each phase judging part is configured to judge that the robot is in the teaching phase when the teaching mode is selected.

3. The robot system according to claim 1, wherein
each of the at least two robot controllers further comprises a display part displaying a content of an abnormality at the teaching console when an abnormality occurs at the robot controller or the corresponding robot, and
each phase judging part is configured to judge that a robot at which an abnormality has occurred or a robot controlled by a robot controller at which an abnormality has occurred is in a maintenance phase.

* * * * *